United States Patent [19]

Eiermann et al.

[11] Patent Number: 4,830,591
[45] Date of Patent: May 16, 1989

[54] LUBRICATION SYSTEM FOR A ROTARY-PISTON INTERNAL COMBUSTION ENGINE

[75] Inventors: Dankwart Eiermann, Weissensberg-West; Hans-Jürgen Klusowski, Hergensweiler, both of Fed. Rep. of Germany

[73] Assignee: Wankel GmbH, Berlin, Fed. Rep. of Germany

[21] Appl. No.: 197,994

[22] Filed: May 24, 1988

[30] Foreign Application Priority Data

May 26, 1987 [DE] Fed. Rep. of Germany ....... 3717801

[51] Int. Cl.$^4$ .......................... F01C 1/22; F01C 21/04
[52] U.S. Cl. ...................... 418/61.2; 418/91; 418/94
[58] Field of Search ............... 418/61.2, 94, 83, 88, 418/91; 184/6.16

[56] References Cited

U.S. PATENT DOCUMENTS

| 3,249,094 | 5/1966 | Hoppner et al. | 418/61.2 X |
| 3,481,312 | 12/1969 | Bensinger et al. | 418/91 |
| 3,771,903 | 11/1973 | King et al. | 418/94 X |
| 4,293,289 | 10/1981 | Morita | 418/88 X |
| 4,297,090 | 10/1981 | Hoffmann | 418/94 X |

FOREIGN PATENT DOCUMENTS 1160112 6/1985 U.S.S.R. ............... 418/61.2

Primary Examiner—Carlton R. Croyle
Assistant Examiner—Leonard P. Walnoha
Attorney, Agent, or Firm—Becker & Becker, Inc.

[57] ABSTRACT

A lubrication system for a rotary-piston internal combustion engine of the trochoid type with roller or needle bearings between the eccentric and the rotor. Lubricating oil in a dosed quantity is passed through a bore in the side part adjacent the gearing between the shaft and the pinion of the gear, from where it is supplied to the connection of the eccentric where, due to the centrifugal force, it is sprayed or splashed into a collector plate at the eccentric wall at the side of the gear. A bore leads from this collector plate to the eccentric bearing and passes the oil into the bearing under the influence of the centrifugal force. Excess oil serves to lubricate the gear and the gas seal elements.

4 Claims, 2 Drawing Sheets

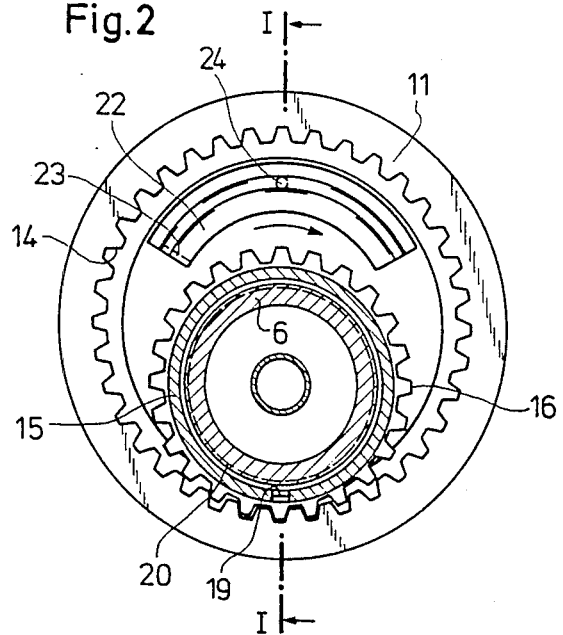

LUBRICATION SYSTEM FOR A ROTARY-PISTON INTERNAL COMBUSTION ENGINE

BACKGROUND OF THE INVENTION

The present invention relates to a lubrication system for a rotary-piston internal combustion engine that includes a casing comprised of two side parts and a piston housing or cover part that has a trochoidal surface; a shaft passes through said casing and supports an eccentric about which a multi-cornered piston moves or orbits on roller or needle bearings.

In such engines, the bearings of the eccentric and the gears of the synchromesh are lubricated by cooling oil or by the intake air, essentially without quantitative metering or dosing, which above all requires that the working chambers be sealed against oil penetrating from the bearing and the gear space; in addition, the oil consumption is very high.

It is therefore an object of the present invention to achieve a controlled and quantitatively dosed lubrication of the bearings of the eccentric and of the synchromesh gear.

BRIEF DESCRIPTION OF THE DRAWINGS

This object, and other objects and advantages of the present invention, will appear more clearly from the following specification in conjunction with the accompanying schematic drawings, in which:

FIG. 2 is a radial cross-sectional view through the same engine, taken in the plane II—II in FIG. 1.

SUMMARY OF THE INVENTION

Figure 1:
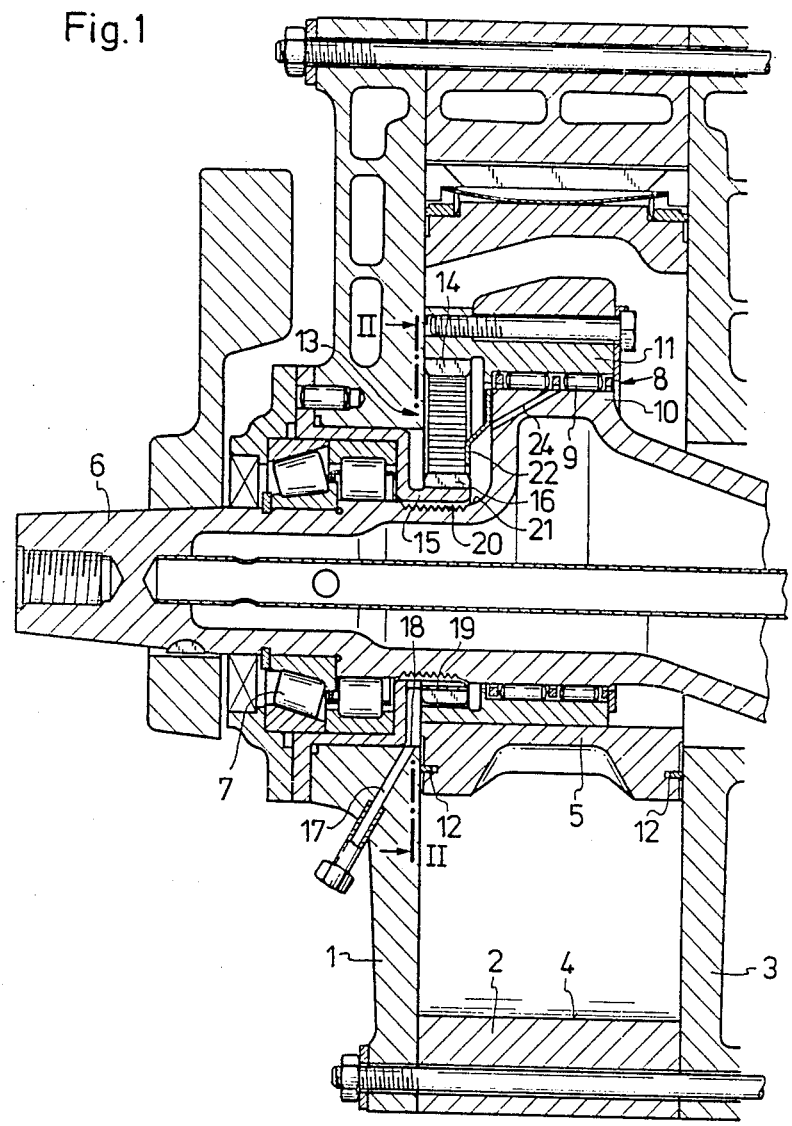
FIG. 1 is a partial axial cross-sectional view through a rotary-piston internal combustion engine that is provided with one exemplary embodiment of the lubrication system of the present invention, and is taken in plane I—I of FIG. 2.

The lubrication system of the present invention is characterized in that a bore is provided in that side part adjacent the gearing to supply a dosed quantity of oil to a groove in a contact side of the pinion or the shaft, in that at least that portion of the shaft that is disposed within the pinion is provided with screw threads for conveying oil from the groove in a direction toward the eccentric, in that a collector plate is disposed on a side of the eccentric that faces the gearing for collecting oil sprayed from the shaft, and in that directly where the collector plate is connected to the eccentric, at the maximum of eccentricity, a further bore is provided in the eccentric and opens in a central plane of the eccentric bearing.

It is a specific advantage of the invention that with such a lubrication of eccentric bearings and gears that are not included in an oil circulation system nor are lubricated by cooling air, an internal oil seal between the side parts of the casing and the piston may be omitted. With the oil being supplied in the radial central plane of the eccentric bearing, a uniform lubrication of the bearing rollers or needles is ensured. The oil splashed off by the shaft to the side of the collector plate provides for a sufficient and quantitatively dosed lubrication of the gear set.

Further specific features of the present invention will be described in detail subsequently.

DESCRIPTION OF PREFERRED EMBODIMENTS

Referring now to the drawings in detail, FIG. 1 shows the left side part 1, the piston housing or cover part 2, and part of the central housing 3 of a multiple-unit type rotary-piston internal combustion engine, with a bi-arched trochoidal surface 4 and a triangular rotor or piston 5. The eccentric shaft 6, which is of a hollow design, is suitably supported in the twin-type shaft bearing 7 in the side part 1; the shaft 6 is also supported in the right-hand side part in a manner not visible in the drawing. The eccentric bearing 8 is a roller bearing, the rollers 9 of which rotate directly on the surface of the eccentric 10 in an outer bushing 11. The piston 5 is merely provided with gas seals 12. The synchromesh gear 13 is provided on the left side of the eccentric 10 and comprises an integral gear 14, which is secured to the piston, as well as a pinion 16 that is attached to an element 15 which is screw-fastened in the side part 1 and surrounds the shaft bearing 7.

The lubricating oil for the eccentric bearing 8 is supplied through a bore 17 in the side part 1; the bore 17 enters obliquely from outside and from the bottom, and opens into a radial bore provided under the right face of the internal gear 14, or into a tube 18 that is provided at that location and that in turn communicates with an axial groove 19 that is provided on the contact side of the pinion 16 on the eccentric shaft 6. This groove 19 is thus open toward the eccentric shaft 6, which rotates opposite the pinion 16. In the area of this groove 19, the eccentric shaft 6 is provided with fine screw threads 20, which act as a feeding worm to carry the oil to the curvature 21 of the surface of the eccentric shaft 6 toward the eccentric 10. Within the region of maximum eccentricity, the oil creeping along the shaft is sprayed or splashed upwardly, under the effect of the centrifugal force, at the left face of the eccentric, where a collector plate 22 is a metal sheet that is bent about the center of the eccentric and extends obliquely inwardly toward the face of the eccentric and outwardly. At its trailing end 23 (in the direction of rotation of the eccentric 10), the collector plate 22 is radially closed off, while it is open at its opposite end so as to collect the oil arriving there. The collector plate 22 extends at an angle of eccentricity of roughly 25° to the right and the left side of its maximum of eccentricity. At this maximum, under the connection point of the collector plate 22, opens a bore 24 in the eccentric 10; this bore 24 leads to the center of the eccentric bearing-through the upper left corner of the eccentric 10 without intersecting the cavity the eccentric.

Due to the centrifugal force, the oil arriving at the collector plate 22 is forced by the plate into the bore 24 and into the eccentric bearing 8, where it is distributed by the rotation of the rollers in the eccentric bearing 8. The oil which is not collected by the plate 22 enters the space of the synchromesh gear 13, where it is distributed over the toothing thereof.

The quantity of oil supplied to the eccentric bearing 8 and the gear is so small that passage or overflow of oil into the chambers of the engine will not occur in a manner that could adversely affect an expedient exhaust production. However, the quantity of oil is sufficient to lubricate the gas seal elements.

The present invention is, of course, in no way restricted to the specific disclosure of the specification and drawings, but also encompasses any modifications within the scope of the appended claims.

What we claim is:

1. In a lubrication system for a rotary piston internal combustion engine that includes a casing comprised of two side parts and a piston housing that has a trochoid surface, whereby a shaft passes through said casing and supports an eccentric about which a multi-cornered piston moves on roller or needle bearings of eccentric bearing means, and whereby a synchromesh gearing is provided that includes a pinion that is secured to one of said side parts between the latter and said eccentric, the improvement wherein:

a bore is provided in said one side part to supply a dosed quantity of oil to a groove in a contact side of said pinion on said shaft;

at least that portion of said shaft that is disposed within said pinion is provided with screw threads for conveying oil from said groove in a direction toward said eccentric;

a collector plate is disposed on a side of said eccentric that faces said gearing for collecting oil sprayed from said shaft; and directly where said collector plate is connected to said eccentric, at the maximum of eccentricity, a further bore is provided in said eccentric and opens in a central radial plane of said eccentric bearing means.

2. A lubrication system according to claim 1, in which said collector plate is a metal plate that extends at an angle toward said shaft and said gearing, and is curved about the axis of rotation of said eccentric.

3. A lubrication system according to claim 2, in which, when viewed in the direction of rotation, the trailing end of the said collector plate is radially closed off.

4. A lubrication system according to claim 2, in which said collector plate extends at an angle of approximately 25° on both sides of the axis of eccentricity.

* * * * *